(12) United States Patent
Lavin

(10) Patent No.: US 10,291,570 B2
(45) Date of Patent: May 14, 2019

(54) SYSTEM AND METHOD FOR DETECTING RELEVANT MESSAGES

(71) Applicant: Interactive Intelligence Group, Inc., Indianapolis, IN (US)

(72) Inventor: Matthew David Lavin, Raleigh, NC (US)

( * ) Notice: Subject to any disclaimer, the term of this patent is extended or adjusted under 35 U.S.C. 154(b) by 349 days.

(21) Appl. No.: 15/043,799

(22) Filed: Feb. 15, 2016

(65) Prior Publication Data

US 2017/0237697 A1    Aug. 17, 2017

(51) Int. Cl.
*G06F 15/16*    (2006.01)
*H04L 12/58*    (2006.01)

(52) U.S. Cl.
CPC ............ *H04L 51/24* (2013.01); *H04L 51/046* (2013.01); *H04L 51/16* (2013.01)

(58) Field of Classification Search
CPC ......... H04L 51/12; H04L 51/24; H04L 51/32; H04L 65/403
USPC ...................................................... 709/206
See application file for complete search history.

(56) References Cited

U.S. PATENT DOCUMENTS

| 7,991,764 | B2 * | 8/2011 | Rathod | G06F 17/30867 |
| | | | | 707/713 |
| 2011/0270922 | A1 * | 11/2011 | Jones | G06F 3/0486 |
| | | | | 709/204 |
| 2012/0296991 | A1 * | 11/2012 | Spivack | G06Q 10/10 |
| | | | | 709/206 |
| 2014/0358929 | A1 * | 12/2014 | Bailey | G06F 16/95 |
| | | | | 707/738 |
| 2015/0256636 | A1 * | 9/2015 | Spivack | G06Q 10/10 |
| | | | | 715/736 |
| 2017/0230427 | A1 * | 8/2017 | Denker | H04L 65/1069 |
| 2017/0262943 | A1 * | 9/2017 | Akutagawa | G06Q 50/01 |
| 2018/0293607 | A1 * | 10/2018 | Huddleston | G06Q 50/01 |

* cited by examiner

*Primary Examiner* — Frantz B Jean

(57) ABSTRACT

A system and method are presented for detecting messages relevant to users in a collaborative environment. In a unified collaboration system, large volumes of messages between a plurality of users in a group may be monitored for relevance to a particular user. Analytics may be applied to the content of the messages to determine which of the plurality of users are relevant and should be alerted. Alerts may notify relevant users that there are messages which may require attention. Non-relevant information in messages may also be hidden or filtered for a user. In an embodiment, users and subject matters may be linked together. For example, words in a message may be related to specific sub-topics of a group and may be associated with a user over time based on when the word is used and which users respond.

32 Claims, 3 Drawing Sheets

200

SYSTEM AND METHOD FOR DETECTING RELEVANT MESSAGES

BACKGROUND

The present invention generally relates to telecommunications systems and methods, as well as unified collaboration systems. More particularly, the present invention pertains to parsing large volumes of information for relevant information within these systems.

SUMMARY

A system and method are presented for detecting messages relevant to users in a collaborative environment. In a unified collaboration system, large volumes of messages between a plurality of users in a group may be monitored for relevance to a particular user. Analytics may be applied to the content of the messages to determine which of the plurality of users are relevant and should be alerted. Alerts may notify relevant users that there are messages which may require attention. Non-relevant information in messages may also be hidden or filtered for a user. In an embodiment, users and subject matters may be linked together. For example, words in a message may be related to specific sub-topics of a group and may be associated with a user over time based on when the word is used and which users respond.

In one embodiment, a method is presented for user notification in a system, wherein the system comprises a server operatively connected to a network and a database, wherein the network is further connected to users via a collaboration protocol, wherein the method comprises: receiving, by the server from the collaboration protocol, a message, wherein the message comprises at least one of: words and tagged system users; updating, by the server, a table comprising words, wherein the table is housed in the database, and wherein the words are associated with system users from the message received; determining, by the server, whether there is a strong association between at least one word from the message and a system user; and notifying, by the server, the system user determined to be associated with the message, otherwise taking no further action if there is not a strong association.

In another embodiment, a method is presented for user notification in a unified collaboration system, wherein the system comprises a server operatively connected to a network and a database, wherein the network is further connected to a plurality of users via a collaboration protocol, wherein the method comprises: receiving, by the server from the collaboration protocol, a message, wherein the message comprises at least one of: words and tagged users; updating, by the server, a table comprising words, wherein the table is housed in the database, and wherein the words are associated with at least one of the plurality of users from the message received; determining, by the server, whether there is an association between at least one word from the message and at least one of the plurality of users; and notifying, by the server, the at least one of the plurality of users determined to be associated with the message, otherwise, taking no further action if there is no association.

DETAILED DESCRIPTION

Figure 1:
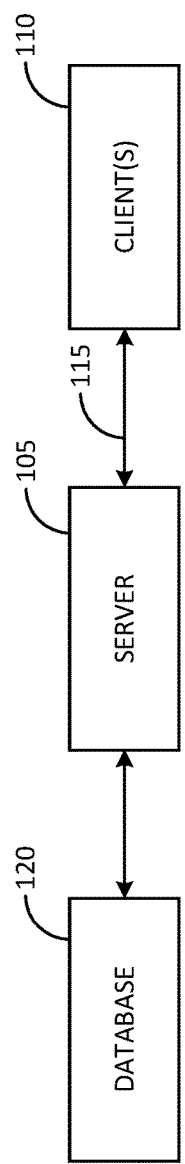
FIG. 1 is a diagram of an embodiment illustrating a system for association and notification.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Advances in technology have made it possible for team members, employees, and people to come together and interact no matter the geographic location. It is no longer necessary to have everyone present physically in the same room to conduct meetings. Face-to-face time can occur over the internet with tools, like collaboration software, for example, which allow interactions through means such as group chat, video conferencing, and desktop sharing. Further, these interactions may occur from anywhere and at any time, not necessarily in real-time, as communications, content, and colleagues are more readily accessible.

In an embodiment, communications may be ongoing, such as forums or chats to which members of groups may belong. These communications may take place in unified collaboration systems, such as Interactive Intelligence Group, Inc.'s, PureCloud Engage®. In systems where collaboration protocols are used, there may be several official groups to which a user belongs, or there may be many users belonging to a group. Each group might discuss a broad range of topics, and all users of the group will see all messages but only a small percentage of the messages may actually have any relevance to a particular user or require that user's attention.

In an embodiment, analytics may be applied to the content of the messages to determine which users are relevant and should be alerted. Alerts may notify relevant users that there are messages which require attention. Non-relevant information in messages may also be hidden or filtered for a user. In another embodiment, users and subject matters may be linked together. For example, certain words in discussion message may be related to specific sub-topics of a group and may be associated with a user over time based on when the word is used and which users respond.

FIG. 1 is an embodiment of a diagram illustrating a system for association and notification, indicated generally at 100. A network may connect at least a server 105 and a database 120. The database 120 may contain tables and information which may be used for association. In an embodiment, any number of databases may be connected to the network. Messages may not be saved on the same database which houses the information and tables. A plurality of clients 110 are connected to the network via a collaboration protocol 115, such as Extensible Messaging and Presence Protocol (XMPP), to name a non-limiting example. Clients 110 may comprise users (such as contact center agents), mobile phones, desktop applications, etc. The server 105 monitors the collaboration protocol 115 between clients 110 and makes connections/associations. Other clients 110 may be pulled into conversations automatically based on the connections/associations. For example, in a contact center environment, during the course of a discussion via web chat, if the agent cannot answer a customer's question, the server 105 may examine the history of the contact center and see which groups or agents are associated with words which have a history of similar questions. As a result, a transfer might be suggested to the agent.

Figure 2:
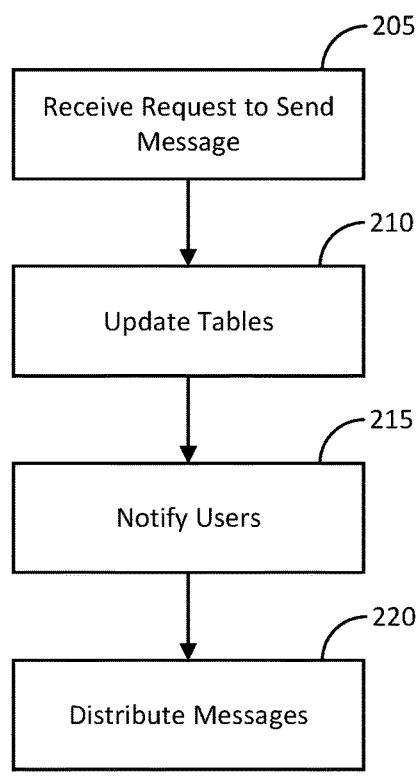
FIG. 2 is a flowchart illustrating an embodiment of a process for association and notification.

FIG. 2 is an embodiment of a flowchart illustrating a process for client association and notification, indicated generally at 200. In an embodiment, the process 200 generally may occur in the server 105 as described above in FIG. 1, such as for adding clients to interactions automatically and/or notifying users that there are messages containing relevant information.

In operation 205, a request is received to send a message. For example, the server 105 receives a request to send a chat message from a user. The message may be input to the collaboration protocol by a user of the system. The message may comprise words and/or mentioned users, which are processed by the server 105. Control is passed to operation 210 and the process 200 continues.

Figure 3A:
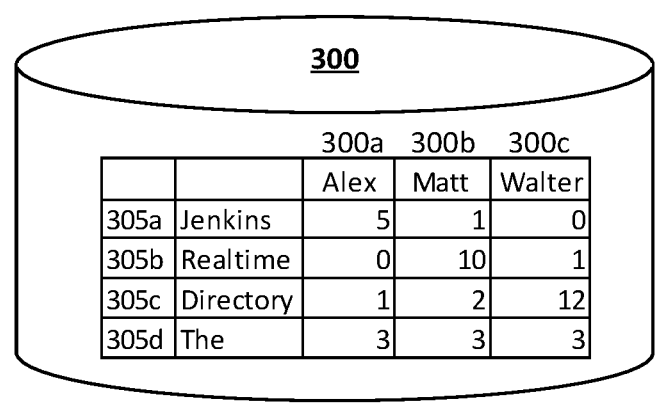
FIG. 3a illustrates an example of an association table.
Figure 3B:
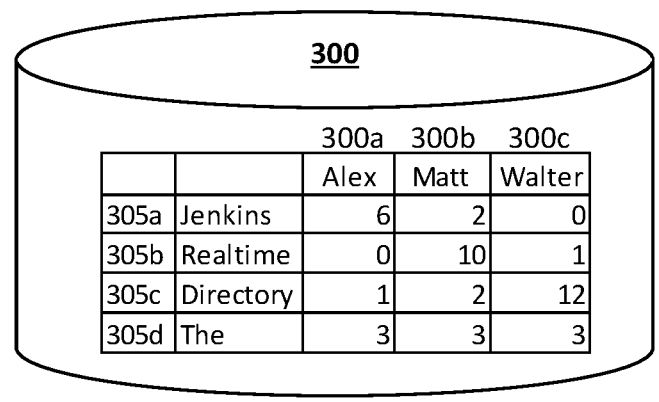
FIG. 3b illustrates an example of an updated association table.

In operation 210, tables are updated. For example, word and user associations may be updated by the server 105 in a table. Tables may be housed in a number of databases connected to the network. FIG. 3A is an example of a record 300. In an embodiment, the record 300 might be constructed based on messages between users within an organization. The record 300 (FIG. 3A) may include a plurality of word fields 305a-d. In this example, four word fields are illustrated, though any number may be used. The words illustrated are, for exemplary purposes, 'Jenkins' 305a, 'Realtime' 305b, 'Directory' 305c, and 'the' 305d. Three users are illustrated in record 300, 'Alex', 'Matt', and "Walter'. Using the example shown in FIG. 3A, the word 'Jenkins' 305a is associated with a score of 5 to user 'Alex' in record 300a, a score of 1 to user 'Matt' in record 300b, and a score of 0 to user 'Walter' in Record 300c. A score of 0 might indicate that user 'Walter' in record 300c is not associated with the word 'Jenkin' 305a. The word 'Realtime' 305b may have a score of 0 to user 'Alex' in record 300a, indicating that there is no associated between user 'Alex' and the word 'Realtime', a score of 10 to user 'Matt' in record 300b, and a score of 1 to user 'Walter' in record 300c. The word "Directory' 305c may have a score of 1 to user 'Alex' in record 300a, a score of 2 to user 'Matt' in record 300b, and a score of 12 to user 'Walter' in record 300c. The word 'the' 305d may have a score of 3 associated with each of the users illustrated in Table 3A.

In an embodiment, when the server 105 notices a new message, words used to build the word-user association may include more words than the newly seen message. For example, words may be collected by the server 105 from messages seen in a previously set interval of time. Words may also be collected from a previously determined number of the most recent messages. The user-word association may also be updated for words not directly sent by a specific user. For example, Table 3A might represent the current state of the system and user 'Matt' sends a message which reads: "I think something is wrong with Jenkins". User 'Alex' may respond with a message: "You are right, I'll fix it now". Table 3A may then be updated for users 'Matt' and 'Alex' regarding the word 'Jenkins' 305a. Table 3B illustrates the newly updated association table to show that for the word "Jenkins" 305a, user 'Alex' now has a score of 6 in record 300b, and user 'Matt' now has a score of 2. User 'Walter' remains unchanged because he was not associated with the word "Jenkins" in this message example.

It is also within the scope of an embodiment that common words, such as "the", "a", or "an", to name a few non-limiting examples, may be excluded from association with users.

In another embodiment, special handling may be applied for user mentions in messages in order to build associations more quickly. For example, the message from user 'Matt' may read: "@Alex, I think something is wrong with Jenkins" as opposed to "I think something is wrong with Jenkins'. User 'Alex' responds with "You are right, I'll fix it now", then user 'Alex' is scored for mention in both messages and the corresponding association score for 'Jenkins' might receive a larger scoring increment, such as 2 instead of 1. Control is passed to operation 215 and the process 200 continues.

In operation 215, users are notified. For example, from Table 3A, if a message is sent within the collaboration protocol with the text "I think something is wrong with Jenkins", the server notices that user 'Alex' has an overwhelming score compared to the other users in the Table 3A. The server may send a notification to user 'Alex' letting him know that a subject area associated with him has been mentioned and that he might want to become involved in the discussion via the collaboration portal. Notifications might comprise an indicator, such as a pop-up window, a color change, etc. Control is passed to operation 220 and the process 200 continues.

In operation 220, messages may be distributed to relevant users and the process 200 ends. For example, messages may be received by a user after notification via the collaboration protocol.

In an embodiment, a user may be able to hide information not relevant to them and thus only view pertinent information. The usage of reliable notifications may keep a user's attention focused in order to avoid distraction. If a conversation is occurring that is not relevant to a user, then notifications (e.g., pop-ups, highlighting unread messages) may be avoided so the user can stay focused on their real task.

In another embodiment, negative associations may be used. A score might be lowered instead of incremented due to factors such as lack of involvement. Conversations comprising certain words may also be de-emphasized.

In another embodiment, words may be excluded completely when the word association tables are constructed. Words like 'the', 'a', 'an', 'is', 'me', etc., may not be associated with a single person and as such may be ignored.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for notifying users of relevant messages in a system, wherein the system comprises a server operatively connected to a network and a database, wherein the network is further connected to users via a collaboration protocol, wherein the method comprises:

a. receiving, by the server from the collaboration protocol, a message sent between at least two users, wherein the message comprises at least one of: words and tagged system users;
b. updating, by the server, a table housed in the database, the table comprising words, wherein each of the words is associated with a plurality of scores corresponding to a plurality of system users, the scores of the table being updated based on the words and the tagged system users of the message received,
  wherein a score of the scores corresponding to a word and associated with one of the at least two users is increased by an increment for positive associations between the word and the one of the at least two users, and
  wherein a magnitude of the increment is larger when the one of the at least two users is one of the tagged system users;
c. determining, by the server, a relevance of a message to a system user based on whether there is a strong association between at least one word from the message and the system user based on the scores relating the words and the system user; and
d. notifying, by the server, the system user determined to be associated with the message based on the scores relating the words and the system user, otherwise taking no further action if there is not a strong association.

2. The method of claim 1, wherein the collaboration protocol comprises chat capabilities.

3. The method of claim 2, wherein the collaboration protocol comprises a plurality of parallel discussions between users of the system.

4. The method of claim 2, wherein the collaboration protocol comprises many users chatting collectively in a group.

5. The method of claim 1, wherein the words associated with system users are based on messages received.

6. The method of claim 1, wherein the updating comprises decrementing a score for negative associations.

7. The method of claim 1, wherein the messages are within an organization.

8. The method of claim 1, wherein the table of words is based on system message history.

9. The method of claim 1, wherein the updating of step (b) further comprises collecting, by the server, all words seen in a number of messages.

10. The method of claim 1, wherein the updating of step (b) further comprises collecting, by the server, all words seen during an interval of time.

11. The method of claim 1, wherein the determining of step (c) further comprises applying special handling for tagged system users in a message.

12. The method of claim 11, wherein the special handling comprises weighted scoring.

13. The method of claim 1, wherein the notifying of step (d) is triggered based on a threshold, wherein the threshold is based on scoring.

14. The method of claim 1, wherein the notifying of step (d) comprises an indicator.

15. The method of claim 14, wherein the indicator comprises one or more of: a pop-up message, high-lighting, font change, and color change.

16. The method of claim 1, wherein the notifying of step (d) is supported by the collaboration protocol.

17. A method for notifying users of relevant messages in a unified collaboration system, wherein the system comprises a server operatively connected to a network and a database, wherein the network is further connected to a plurality of users via a collaboration protocol, wherein the method comprises:
a. receiving, by the server from the collaboration protocol, a message, wherein the message comprises at least one of: words and tagged system users;
b. updating, by the server, a table housed in the database, the table comprising words, wherein each of the words is associated with a plurality of scores corresponding to the plurality of users, the scores of the table being updated based on the words and the tagged system users of the message received,
  wherein a score of the scores corresponding to a word and associated with one of the at least two users is increased by an increment for positive associations between the word and the one of the at least two users, and
  wherein a magnitude of the increment is larger when the one of the at least two users is one of the tagged system users;
c. determining, by the server, a relevance of a message to at least one of the plurality of users based on whether there is an association between at least one word from the message and the at least one of the plurality of users based on the scores relating the at least one word from the message and the at least one of the plurality of users; and
d. notifying, by the server, the at least one of the plurality of users determined to be associated with the message based on the scores relating the at least one word from the message and the at least one of the plurality of users, otherwise, taking no further action if there is no association.

18. The method of claim 17, wherein the collaboration protocol comprises chat capabilities.

19. The method of claim 18, wherein the collaboration protocol comprises a plurality of parallel discussions between the plurality of users.

20. The method of claim 18, wherein the collaboration protocol comprises a number of the plurality of users chatting collectively in a group.

21. The method of claim 17, wherein the words associated with the plurality of users are based on messages received.

22. The method of claim 17, wherein the updating comprises decrementing a score for negative associations.

23. The method of claim 17, wherein the messages are within an organization.

24. The method of claim 17, wherein the table of words is based on system message history.

25. The method of claim 17, wherein the updating of step (b) further comprises collecting, by the server, all words seen in a number of messages.

26. The method of claim 17, wherein the updating of step (b) further comprises collecting, by the server, all words seen during an interval of time.

27. The method of claim 17, wherein the determining of step (c) further comprises applying special handling for tagged users in a message.

28. The method of claim 27, wherein the special handling comprises weighted scoring.

29. The method of claim 17, wherein the notifying of step (d) is triggered based on a threshold, wherein the threshold is based on scoring.

30. The method of claim 17, wherein the notifying of step (d) comprises an indicator.

31. The method of claim 30, wherein the indicator comprises one or more of: a pop-up message, high-lighting, and color change.

32. The method of claim 17, wherein the notifying of step (d) is supported by the collaboration protocol.

* * * * *